May 23, 1967     H. M. JENSEN     3,320,832
DRILL GUIDING TOOLS
Filed Nov. 19, 1964
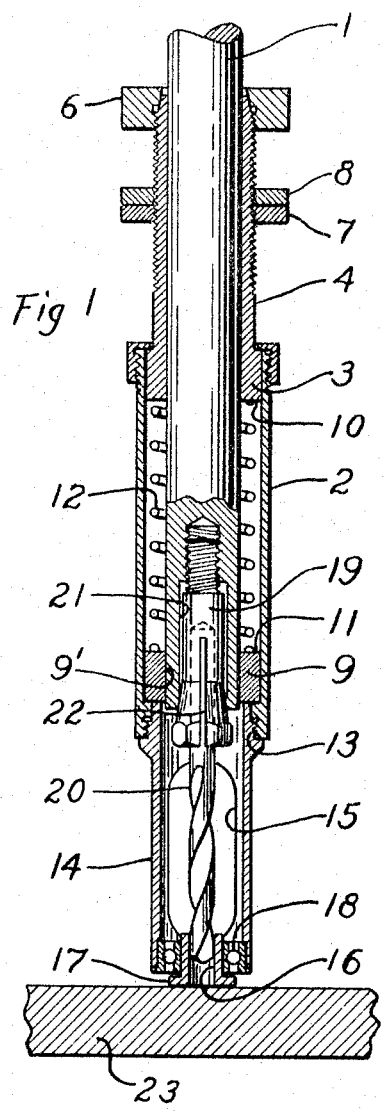
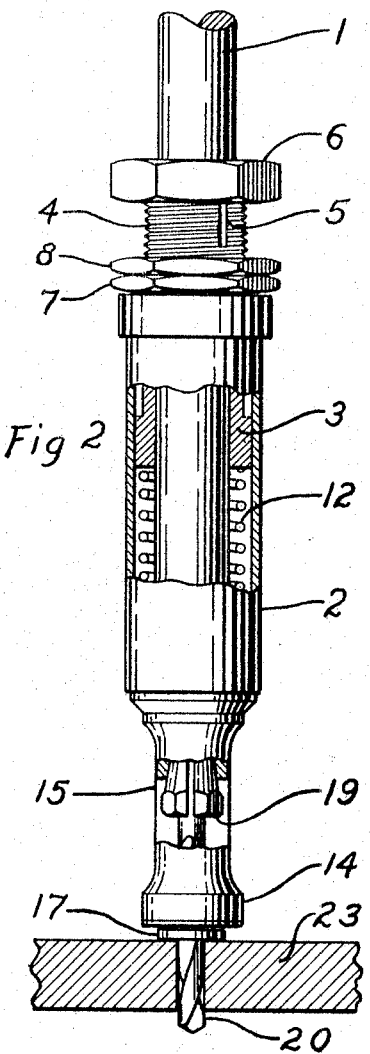
INVENTOR.
Howard M. Jensen
BY Curtis Morris & Safford
his Attorneys

United States Patent Office 3,320,832
Patented May 23, 1967

3,320,832
DRILL GUIDING TOOLS
Howard M. Jensen, East Huntington, N.Y., assignor to Ritmar Corporation, Huntington, N.Y., a corporation of New York
Filed Nov. 19, 1964, Ser. No. 412,412
1 Claim. (Cl. 77—55)

The present invention relates to precision drill guiding apparatus.

In many manufacturing operations where drilling is involved, various expedients are employed to ensure required degrees of accuracy in positioning the holes. Thus, in many instances and depending on different conditions or requirements, the use of templates, jigs, fixtures, etc. for guiding the drills has been resorted to. These devices, however, are not uniformly adequate and, indeed, under many circumstances, are economically not feasible.

An object of the present invention, accordingly, has been to provide a drill guiding apparatus or tool capable of effective use in widely diversified industrial fields with resulting substantial economies in time and cost as compared to known tools for a similar purpose.

A further object has been to provide a drill centering and guiding device which eliminates the use of expensive pre-drilled templates; which operates without the need for jigs, fixtures or pre-arranged guiding means; and which requires no preparatory center drilling, spot drilling or center punching on the work piece, all with corresponding economies in time and with no sacrifice of precision accuracy.

A further object has been to provide a drilling tool of compact design employable effectively in automated machines, turret lathes and drill presses or other drilling equipment.

A drill guiding tool embodying the present invention comprises in general a tubular cylindrical housing, a spindle having an end portion extending longitudinally into said housing, and a drill bit retaining collet operatively connected to the spindle. A cylindrical collar or ring is mounted coaxially on the spindle with its outer or peripheral surface longitudinally slidable on inwardly exposed cylindrical portions of the housing thereby providing a slidable upper spindle guide for a shank or upper end portion of the spindle in said housing. A bushing or ring arranged in fixed relation to the housing provides a fixed lower spindle guide bearing for embracing and centering a lower end portion of the spindle; and a bushing coaxial with and normally, i.e. when inoperative condition rotatable in relation to the housing and including a terminal portion or foot plate provides a drill bit guide bearing positioned operatively to embrace and center a drill bit mounted in said collet. Said upper and lower spindle guides are biased in opposite directions longitudinally by a compression spring encircling the spindle between them.

The above defined tool provides, in effect, three longitudinally spaced coaxial centering guides the first and second of which maintain the central axial position of the spindle; and the third guide receives and centers free end portions of the drill bit immediately adjacent to the spot at which the drill point is intended to enter the work piece when the foot plate is pressed against said work piece.

Other objects and distinctive features of the present invention not above defined or referred to will appear from the following specification and claim and from the accompanying drawings wherein:

FIG. 1 is a view in central longitudinal section showing the tool as mounted for use in a drill press, or the like, and with the drill bit and actuating parts in retracted or normal inoperative position in relation to a work piece to be drilled; and FIG. 2 is a view in elevation with portions broken away showing the positions of the drill bit and bit actuating parts in extended position, as approximately at the end of a drill feeding operation.

As seen in the drawings, the invention is embodied in a tool comprising an actuating spindle 1 which may be operated by conventional drill rotating and feeding devices and a generally cylindrical tubular housing 2. A cylindrical collar or ring 3 having a threaded stem 4 provided with longitudinal slots 5 at its upper end (as seen in FIG. 2) is secured to the shank portion of spindle 1 by any suitable means, as a nut 6 on the slotted portion of stem 4. A stop nut 7 is also threaded on stem 4 and may be locked in various stop positions thereon by a nut 8 to limit the extent of axial or feeding movement of spindle 1.

The outer peripheral cylindrical surface of collar or ring 3 is axially slidable in relation to inner cylindrical surface portions of housing 2 and the inner cylindrical surface or bore of said collar 3 engages said spindle 1 with a sliding fit, thus providing an axially slidable upper spindle guide whereby an upper shank portion of the spindle remains effectively guided or centered therein during its endwise and rotative movement in operation.

An inner or lower end portion of spindle 1 is also centered in housing 2 by a lower guide, as a bushing or ring 9 mounted in fixed position in said housing 2 and having a coaxial bearing bore 9′ dimensioned to receive and slidably embrace a lower end portion of spindle 1. Accordingly, spindle 1 is, in effect, directly guided or centered by two coaxial guides spaced apart longitudinally.

The under surface of collar or ring 3 provides an annular shoulder 10 and the upper surface of bushing or ring 9 provides an annular shoulder 11. A compression spring 12 encircles a shank portion of spindle 1 between ring 3 and ring 9 and with its ends bearing against said shoulders 10 and 11, respectively, thus biasing casing 2 toward the inoperative or normal extended position as shown in FIG. 1.

A cylindrical tubular casing 14 is threaded at 13 to the outer or lower end of housing 2 forming, in effect, a coaxial removable extension thereof having side openings 15 to discharge chips in operation. This casing carries at its free end a drill bit guide or bushing 17 having a central bearing bore 16 and a flange or foot plate extending beyond the outer or lower end of casing 14. In the form shown in FIG. 1, said guide bushing is supported normally, i.e. when the tool is in non-operating condition out of contact with a work piece in freely rotatable relation to said outer end portion of said casing 14 by ball bearings 18, or other suitable means.

A collet 19 for releasably carrying a drill bit 20 is threaded at its inner end to engage a threaded recess at the inner end of a terminal socket 21 in the lower end of spindle 1. The open end of said socket 21 is flared to receive a flared longitudinally slotted portion 22 of the collet 19 whereby, when the inner end of said collet 19 with a drill bit 20 engaged therein is drawn into drill holding position by advancing said collet 19 into said socket, as seen in FIG. 1, the butt of drill bit 20 is clamped in operative position against turning during the drilling operation.

It is noted that the bore 16 of the bit guide 17 effectively embraces free end portions of drill bit 20 so that the latter is accurately centered in said guide which is spaced longitudinaly from and coaxial with the fixed lower spindle guide 9.

In operation, the foot plate or bottom terminal portion of bit guide 17 may be moved with spindle 1 by conventional drill press feed mechanism, for example into and retained, in pressing frictional engagement against an upper surface portion of a work piece, as 23, and in such position that the outer end opening or bore 16 of said guide 17 concentrically encircles the point or spot at which a hole is to be drilled. While spindle 1 is rotating and without rotative movement of any of said guides, continued endwise feeding movement is imparted thereto thence to drill bit 20 against yielding resistance of spring 21. The drill bit guide 17, however, does not turn; but being pressed by spindle 1 through spring 12, housing 2 and casing 14, against work piece 23, becomes, during such pressure, a relatively fixed guide for the drill bit end at the point on the work piece where the bit approaches and then moves into drilling contact with the work piece.

It has been observed that, in the use of a drill device wherein the spindle is centered by guide means as above described and applied at axially spaced portions thereof and wherein the drill bit is centered by guide means pressed against the work as above described and which effectively guide and control the bit end at its point of contact with and entry into the work piece, no runout or wandering of the drill tip occurs so that accurately placed holes may be drilled in various kinds of work pieces without extraneous guides and with material economy in time and equipment.

I claim:

A drilling tool comprising a tubular housing, an actuating spindle including portions positioned coaxially in said housing, spring means operatively interposed between the spindle and the housing and arranged and adapted to bias said housing toward extended position in relation to the spindle, a bit holding collet operatively mounted at the lower end of the spindle, a collar mounted coaxially on said spindle and operatively engaging inner surface portions of the housing to provide a slidable upper guide for said spindle, a bearing mounted in fixed coaxial position in the housing and arranged and adapted to operatively embrace and provide a fixed lower guide for said spindle, a ball bearing assembly mounted coaxially in the lower end of said housing, and a bushing mounted in a portion of said assembly coaxially with the longitudinal axis of the collet and arranged and adapted for guiding engagement with free end portions of a bit operatively engaged in said collet, said bushing including a portion extending coaxialy through said ball bearing assembly and a terminal peripheral flange extending laterally from the lower end thereof and providing a foot plate overlapping downwardly exposed surface portions of said ball bearing assembly, whereby, in operation, when operating pressure is exerted through the spindle, through said spring means, and through the housing, said foot plate is pressed against the work piece being drilled and by frictional engagement therewith and unaided by extraneous bit guiding means effectively retains said bushing and the bit end against lateral displacement when the bit end is brought into drilling contact with the work piece.

References Cited by the Examiner

UNITED STATES PATENTS 2,283,338    5/1942    Pegard    77—62
2,294,303    8/1942    Jagow    77—55

FRANCIS S. HUSAR, *Primary Examiner.*